United States Patent
Iltis (10) Patent No.: US 9,638,811 B2
(45) Date of Patent: May 2, 2017

(54) SYSTEM AND METHOD FOR DETECTING GAMMA RADIATION, SUCH AS A GAMMA CAMERA

(71) Applicant: Alain Iltis, Troyes (FR)

(72) Inventor: Alain Iltis, Troyes (FR)

(*) Notice: Subject to any disclaimer, the term of this patent is extended or adjusted under 35 U.S.C. 154(b) by 0 days.

(21) Appl. No.: 14/438,163

(22) PCT Filed: Nov. 8, 2013

(86) PCT No.: PCT/FR2013/052672
§ 371 (c)(1),
(2) Date: Apr. 23, 2015

(87) PCT Pub. No.: WO2014/072648
PCT Pub. Date: May 15, 2014

(65) Prior Publication Data
US 2015/0331118 A1    Nov. 19, 2015

(30) Foreign Application Priority Data
Nov. 8, 2012 (FR) ...................................... 12 60596

(51) Int. Cl.
*G01T 1/20* (2006.01)
*G01T 1/208* (2006.01)
(Continued)

(52) U.S. Cl.
CPC ............ *G01T 1/208* (2013.01); *G01T 1/1647* (2013.01); *G01T 1/2985* (2013.01);
(Continued)

(58) Field of Classification Search
CPC ...................................................... G01T 1/208
See application file for complete search history.

(56) References Cited

U.S. PATENT DOCUMENTS 3,837,882 A * 9/1974 Swinehart ............... C30B 33/00
250/483.1
5,827,541 A * 10/1998 Yarwood ............... A61K 9/2095
424/464

(Continued)

FOREIGN PATENT DOCUMENTS

EP    2293112 A1    3/2011

OTHER PUBLICATIONS

Stefan Seifert et al: Paper; Monolithic LaBr3: Ce crystals on silicon photomultiplier arrays fro time-of-flight positron emission tomogrpahy; Physics in Medicine and Biology, Institute of Physics Publishing, Bristol GB, vol. 57, No. 8, Mar. 29, 2012, pp. 2219-2233.

(Continued)

*Primary Examiner* — Edwin Gunberg
(74) *Attorney, Agent, or Firm* — Amster, Rothstein & Ebenstein LLP (57) ABSTRACT

The invention relates to a system for detecting gamma radiation, such as a gamma camera, including a source of gamma rays, at least one plate P1 of a fast scintillator, the time thereof for rising to the light peak being less than 1 ns, said plate comprising a diffusing entry surface and a polished exit surface, having a thickness of no less than 10 mm, being provided with photodetectors and microelectronics for dedicated reading, characterized in that the microelectronics are of the ASIC type, in that the detector is segmented, and in that on said plate P1, each segment of said detector is capable of measuring a first trigger T1 such that a time resolution is lower than 100 ps; the detector can measure a space and time distribution of the first adjacent photons emitted by an event on the detectors for a time of more than 100 ps and no longer than the time for rising to the light peak of the scintillator. The invention further relates to the image-reconstruction method implemented in the system, as well as (Continued)

to the implementation and use of said system. The invention additionally relates to the image-reconstruction method and to the method for improving the energy resolution of the detector installed in the system, as well as to the implementation of said system.

12 Claims, 5 Drawing Sheets

(51) Int. Cl.
*G06T 7/00* (2017.01)
*G01T 1/29* (2006.01)
*G01T 1/164* (2006.01)

(52) U.S. Cl.
CPC .. *G06T 7/0085* (2013.01); *G06T 2207/10104* (2013.01); *G06T 2207/10108* (2013.01)

(56) References Cited

U.S. PATENT DOCUMENTS

| | | | |
|---|---|---|---|
| 5,841,140 A | 11/1998 | McCroskey | |
| 6,791,090 B2* | 9/2004 | Lin | G01T 1/242 |
| | | | 250/336.1 |
| 7,180,074 B1 | 2/2007 | Crosetto | |

OTHER PUBLICATIONS

Anton G. et al: "3D-Position-Sensitive Compact Scintillation Detector as Absorber for a Compton-Camera", IEEE Transactions on Nuclear Science, IEEE Service Center, New York, NY US, vol. 52, No. 3, Jun. 1, 2005, pp. 606-611.
English Translation of International Search Report of PCT/FR2013/052672 dated Apr. 4, 2014.

* cited by examiner

SYSTEM AND METHOD FOR DETECTING GAMMA RADIATION, SUCH AS A GAMMA CAMERA

FIELD OF THE INVENTION

The invention relates to gamma ray source imaging. More particularly, the invention relates to a system for detecting gamma radiation, based on a gamma camera, and the image-reconstruction method implemented in such a system. The invention further relates to the application of the detection system in the field particularly of astronomy and the medical field, and the application of said system to a PET or SPECT type imaging system.

At the present time, gamma ray (>30 KeV) source imaging is essentially performed for medical diagnostic purposes based on two techniques: PET and SPECT.

The SPECT (Single-Photon Emission Computerized Tomography) technique uses the emission imaging principle. In this case, it is sought to track the distribution of radioactive tracers emitting monoenergetic gamma photons inside an object to be analysed. The photon emission being isotropic, a collimator is placed in front of the camera to select the incoming direction of the photons. The gamma ray is then converted into UV photons in a 10 to 20 mm thick plate of a scintillating crystal such as NaI:TI. The UV photons are emitted isotropically and then channelled by reflection onto the crystal plate interfaces. For this reason, the light intensity distribution is a spot wherein the intensity decreases in 1/R. Anger logic consists of determining by means of photodetectors, particularly of the photomultiplier type, the centroid of the light spot. This infers the location where the gamma radiation was detected. In this technique, photodetector segmentation below 50 mm also does not provide spatial resolution.

The PET (Positron Electron Tomography) technique requires a positron source. Two 511 KeV gamma rays emitted in anticoincidence are detected by means of dense scintillating crystal arrays arranged in rings about the source (EGO, LSO, LaBr3) are detected. The detection system consists of single-crystal arrays (typically 4*4*25 mm) which are read by a multi-channel photodetector (Photomultiplier or Si-PMT), the channel size being adapted to the crystal size. This is followed by a signal amplification and processing stage frequently in discrete electronics.

STATE OF THE PRIOR ART

In the current PET technique, true noise interaction due to Compton scattering is distinguished by means of the following features: the two pixels activated are at the antipodes of the ring; the energy from the interaction is equivalent to 511 KeV; furthermore, both photons touch the detector substantially at the same time. This technique is only applicable with scintillators wherein the rise time to the light peak is rapid such as LSO, LaBr3 or EGO.

One of the drawbacks of this technique is that it is costly to segment crystals into pixels, particularly for hydroscopic crystals. Furthermore, this segmentation degrades the energy resolution. Finally, this technology only works suitably with very dense crystals to prevent the Compton effect (BGO=Bismuth Germanate; LSO or LYSO=Lutetium Silicate). This involves the use of rare and expensive raw materials (Germanium, Lutetium, etc.).

In the SPECT technique, a single photon is detected, wherein the energy varies according to the radioisotope used (from 100 KeV to 1000 KeV), by means of a scintillating crystal plate (NaI, CsI, LaBr3) and which is read by large photodetectors (PMTs). To obtain an indication on the direction of photon incidence, it is necessary to have lead collimators in front of the crystal which are large, bulky and heavy and which stop a large proportion of the radiation emitted. Furthermore, the spatial resolution in respect of SPECT is less than that in respect of PET due to a lack of precision in localising the interaction.

Two further problems are to be solved for SPECT:
SPECT only functions if the scintillator plate is continuous. Consequently, it is not possible to attach two small plates to construct a larger one. For this reason, the use of the new generation of scintillators, LaBr3, wherein the crystals are relatively small (maximum diameter 100 mm) is currently limited for SPECT:
when two gamma photons interact with the scintillating plate at adjacent times (approximately 300 ns), the image of the spot and the energy measurement are very disrupted, thus the events are rejected. In this case, pile-up is said to have occurred.

PET functions on a different principle: a radioelement emits a positron which is disintegrated to two 511 KeV gamma photons emitted at 180°. The coincident arrival of two 511 KeV photons is then detected on a crystal ring situated around the patient. If a sufficiently fast scintillator is used, it is possible to succeed in enhancing the precision of the localisation of the event via the time of flight (difference between the arrival time of the two photons at the two opposite ends of the ring). However, the current systems involve the following problems: 1) the scintillator must be segmented into pixels (4*4*30 mm for example) which is costly, 2) if the location of the interaction in the pixel is not known, this may generate geometric uncertainty which degrades image quality. This further degrades the precision of the time of flight measurement, effectively limiting this measurement around 250 ps.

Systems have been proposed to measure the DOI (depth of interaction) on PET, but they are either unconvincing, or very costly (two detector layers).

Furthermore, the difficulty processing Compton events has led to very dense, generally Lithium-based, scintillators being sought, which are very costly.

The main aim of the invention is thus that of proposing a novel technique making it possible for SPECT to:
1) enhance the spatial resolution;
2) increase the image contrast significantly;
3) be able to use via suitable deconvolution two adjacent events which would be rejected due to pile-up;
4) be able to suitably read events on a plate consisting of small pieces bonded together and
5) enable the upgrade of the existing SPECT equipment base since the total volume of the collimator/scintillating crystal/processing electronics elements is advantageously less than the volume of current detectors.

The detection system may further function in the same way with no collimator for PET mode. In the context of PET, the advantages thereof are as follows:
1) Obtaining a high spatial resolution (<5 mm) without requiring scintillator segmentation
2) Measuring the depth of interaction in the scintillator with a single photodetector layer
3) Enhancing the precision of the time of flight by means of very precise time-of-flight correction
4) Obtaining optimum performances with relatively less expensive scintillators.

DESCRIPTION OF THE INVENTION

The aim of the invention is that of proposing a system for detecting gamma radiation, such as a gamma camera, including a source of gamma rays, at least one plate P1 of a fast scintillator, the rise time thereof to the light peak being less than 1 ns with a scattering entry surface and a polished exit surface, having a thickness less than or equal to 10 mm, equipped with photodetectors and dedicated reading microelectronics, characterised in that the dedicated reading microelectronics are of the ASIC type, in that the detector is segmented, in that on said plate P1, each segment of said detector is suitable for measuring a first trigger T1, corresponding to the time of impact of the first UV ray emitted by scintillation onto said plate P1 such that a lower time resolution is less than 100 ps, preferably less than 20 ps, in that the detector is suitable for measuring a spatial and time distribution of the first adjacent photons emitted by an event on the detectors for a time of more than 100 ps and less than or equal to the rise time to the light peak of the scintillator thus suitable for spatially situating said event "e1" having the coordinates (X1, Y1) and in that the detector is further suitable for processing spatial and time distribution differences between unscattered photons and scattered photons so as to reconstruct the spatiotemporal coordinates (X, Y, Z, T) of said scintillation event.

The term trigger denotes the time of impact of the gamma ray on a scintillator plate.

Indeed, the photodetector and the dedicated reading electronics are capable of detecting the first incident photons with a very high temporal resolution and with temporal response dispersion/channel less than 100 ps, preferably less than 20 ps for each channel. The difference between the first trigger of the event and the triggers of the adjacent channels in a radius equal to twice the thickness of the plate is measured. A spatial distribution of the delays (X, Y, DT) is obtained, for which the minimum is calculated using statistical methods. The event e1 is localised on the normal of this minimum.

Indeed, the location of the event is situated on the normal of the minimum of the trigger distribution.

Furthermore, the unscattered photons are the first photons detected and they are distributed inside a disk wherein the radius is dependent on a depth of interaction (Z) and wherein the centre represents a position (X, Y) of the event.

Furthermore, the detector is suitable for measuring the exact time of the interaction T by reconstructing a trajectory in the scintillator of the first ten photons detected.

According to one alternative embodiment of the invention, the plate P1 is of the Lanthanide Halide type, equipped with photodetectors segmented with an interval at least less than half the thickness thereof, preferably less than 4 mm and wherein the ASIC type dedicated reading microelectronics includes an analogue part having a temporal resolution per channel, for triggers less than 50 ps.

Preferably, the detector is further suitable for measuring a spatial distribution of the luminosity A1 in (X'1, Y'1) and the integral of the energy E1 as in a conventional gamma camera.

Moreover, the detector is an Si-PMT or APD type semiconductor detector.

Indeed, the measurement of each pixel in the detector (for example Si-PMT) is performed by means of dedicated combined analogue/digital ASIC type microelectronic components, so as to enable high-speed detection of the first photons.

According to one alternative embodiment of the invention, the system includes multitude of scintillator plates bonded edge to edge, so as to form a large surface area and correct the edge effects, said surface area may be either a plane for a SPECT application or a ring for a PET application.

According to a further embodiment, the detection system further includes a second scintillator plate P2 of a thickness suitable for absorbing at least 80% of the energy of the gamma ray, said second plate being separated from the first plate P1 by a distance 'D' of at least 10 mm; the system further includes an estimation module for determining a valid event, a module for estimating the Compton deviation; it is suitable for measuring on said second plate P2 a first trigger T2, a spatial distribution of the triggers suitable for spatially situating an event "e2" in (X2, Y2, Z2), a spatial distribution of luminosity A2 in (X'2, Y'2) and the energy E2 emitted during the event "e2" in said plate P2; and said second plate P2 is suitable for obtaining information on the path of the gamma ray without rejecting any.

Advantageously, the detection system includes a module for computing the valid event, wherein the temporal distribution vectors, the time of gamma ray impact on the plates, and the spatial distribution vectors are intersected in order to enhance the precision of the localisation of the interaction in said plates.

Advantageously, the plates (P1) or (P1 and P2), the photodetectors and the electronic components are arranged in a tight enclosure.

Advantageously, the assembly of "Plates/Photodetectors/Processing electronics" has a volume less than NaI plate-based detectors, such that said assembly may be installed on existing SPECT machines.

Given the more compact design of the detectors and the processing electronics with respect to a conventional camera, such a system may easily replace existing devices on known cameras.

The invention further relates to an image-reconstruction method implemented in the above system characterised by the following steps: on the plate P1 during the impact of a gamma photon:

measuring a first trigger T1, corresponding to the time of impact of the first UV photon on the plane of the detectors segmented on said plate P1;

measuring a spatial and temporal distribution of the adjacent triggers, on the plane of the photodetectors, in order to spatially situate an event "e1" in (X1, Y1) on the normal of the minimum of the trigger distribution;

further measuring a spatial distribution of the luminosity A1 in (X'1, Y'1) and the integral of the energy E1 as in a conventional gamma camera.

The invention further relates to a detection method including the following steps:

on the plate P2:

measuring a first trigger T2;

measuring a spatial and temporal distribution of the triggers in order to spatially situate the event "e2" in (X2, Y2, Z2);

measuring a spatial distribution of the luminosity A2 in (X2, Y2) and the energy E2 emitted during the event "e2" in said plate P2;

determining a valid event using an estimation module by performing the following two tests:

a) T2=T1+propagation time of light between e1 and e2 b) E1+E2=Energy of radioisotope used;

determining the Compton deviation having the angle "alpha" with a precision dα in relation to the initial direction of the gamma ray, the ratio of the energies (E1/E1+E2) is suitable for estimating the Compton deviation;

defining information on the path of the gamma ray.

The invention further relates to a method for enhancing the resolution of the detection in terms of energy used in the above system characterised by the following steps:
- defining a disk corresponding to the light cone of the unscattered photons;
- counting the number of unscattered photons detected on the disk defined in the previous step for a duration greater than the rise time to the light peak of the scintillator; and
- defining the gamma photon energy, said energy being proportional to the number of unscattered photons detected.

The invention further relates to the application of the above system to a SPECT type or PET type medical imaging system.

The invention further relates to the use of the system defined above in fields wherein the number of gamma photons to be detected is low, such as astronomy.

BRIEF DESCRIPTION OF THE FIGURES

Further features, details and advantages of the invention will emerge on reading the following description, with reference to the appended figures, illustrating.

DETAILED DESCRIPTION

The principle of scintigraphic explorations is that of determining, and viewing in image format, the biodistribution in the body, of a radiopharmaceutical element previously injected into a patient. For this, a system for detecting radioactivity capable of identifying the presence of the labelled molecules and also of localising such molecules in three-dimensional space (tomography) is required.

Such marker materials exist: they consist for example of sodium iodide crystal (NaI) doped with thallium. This crystal is currently the basic element of any detection chain. Indeed, thallium absorbs photons emitted by NaI and "re-emits" a constant fraction in the form of 3 eV ultraviolet photons for which the crystal is transparent. It should be noted that, in the crystal, there is a considerable loss of light photon emission. At this stage, it is necessary to convert the light photons into electrical current. This is possible by means of a device called a photomultiplier. The electrical signals output from the photomultipler may then be processed by an electronic system and the information becomes suitable for use.

In the case of PET (Positron Electron Tomography) type cameras, they require a positron source. As explained above, in a known manner, two 511 KeV gamma rays emitted in anticoincidence are detected by means of scintillating crystal arrays (BGO, LSO, LaBr3) arranged in rings about the positron source. The PET type camera consists of a single-crystal array, typically 4*4*25 mm, read by a multi-channel photodetector, photomultiplier or Si-PMT; the channel size is frequently adapted to the crystal size. This is followed by a signal amplification and processing stage frequently in discrete electronics. In such cameras, true noise interaction due to Compton scattering is distinguished by means of the following features:
- the two pixels activated are at the antipodes of the ring;
- the energy from the interaction is equivalent to 511 KeV; and
- both photons touch the detector at the same time within 1 ns (nanosecond). With fast scintillators such as LSO, LaBr3, it is even possible, by measuring the difference between the time of impact of the opposite sides to the ring, to infer the position of the interaction; this is the time-of-flight mode. This feature is described in the article "Monolithic LaBr3:Ce crystals on silicon photomultiplier arrays for time of flight positron emission tomography", 'Stefan Seifert, Herman T van Dam . . . ' published on 29 Mar. 2012.

Figure 1:
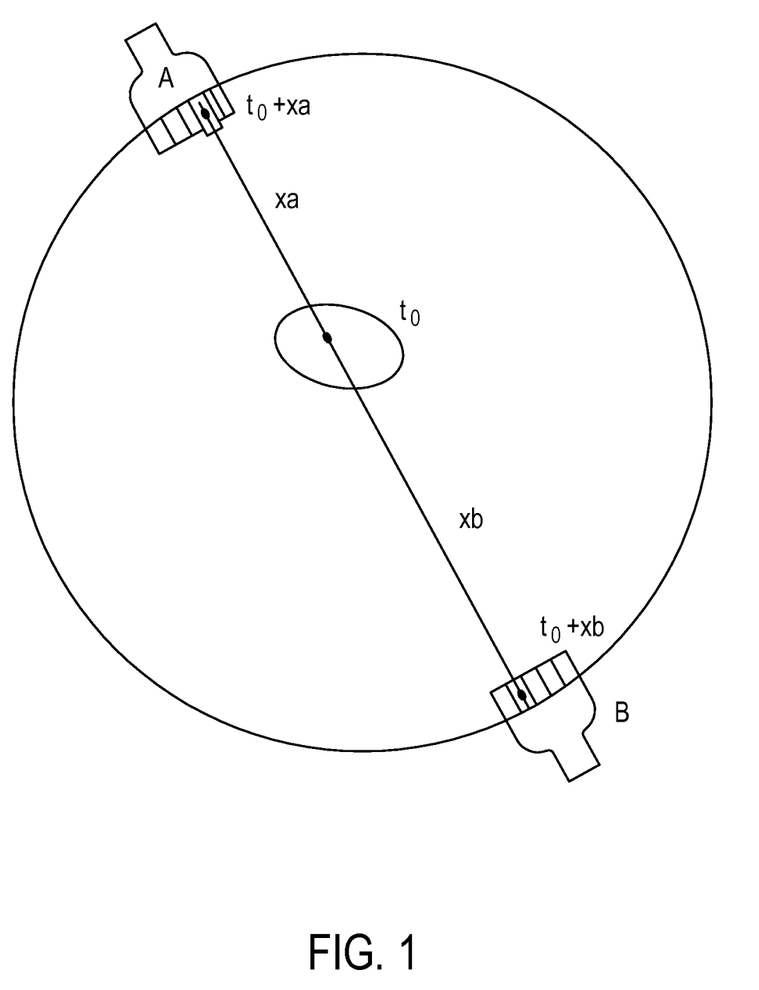
FIG. 1 shows the principle of the emission of two gamma photons in the conventional PET technique.

The principle of the "PET" technique is illustrated in FIG. 1, wherein t0 is the time of emission of two γ (gamma) photons of 511 KeV each. These photons are detected by two opposite detectors in coincidence. In this case, the event takes place on the line AB, and both photons touch the detectors at the same time. The time of flight is equivalent to (t0+Xb)−(t0+Xa). It is inferred that the event is offset by Xb−Xa from the centre of the circle, where Xb is the distance travelled between the time of emission of the gamma ray γ and the time when said, ray touches a detector at a point B. Similarly, Xa is the distance travelled between the time of emission of the γ ray and the time when said ray touches another detector at a point A of the line. The line segment AB is approximately 400 ps equivalent to 12 cm.

Figure 2A:
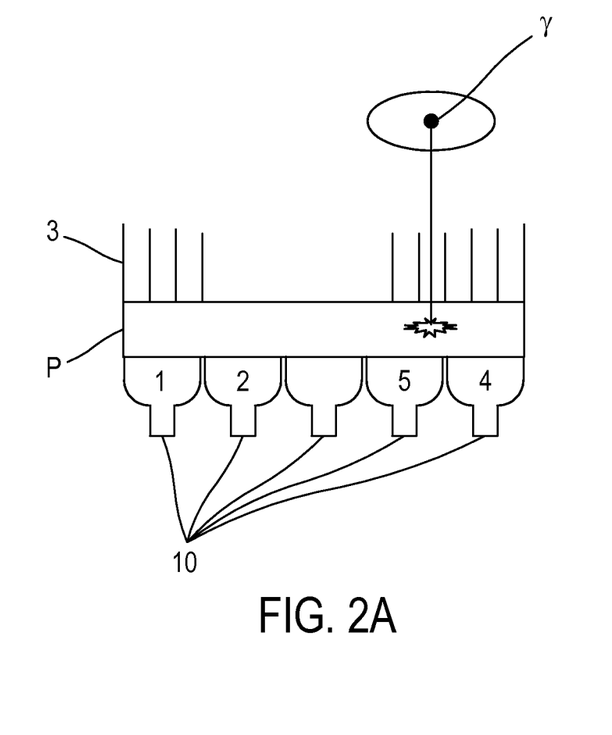
FIG. 2A shows the principle of the conventional SPECT technique.
Figure 2B:
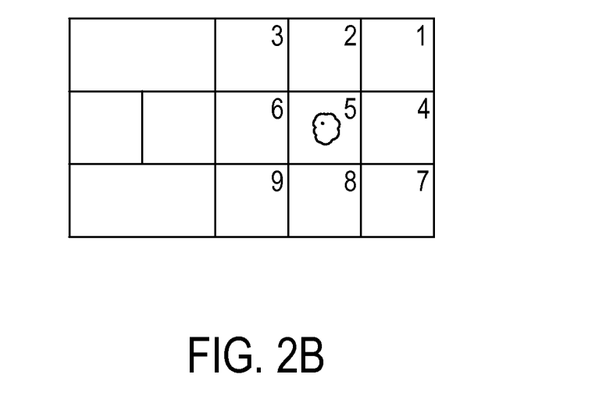
FIG. 2B shows the light intensity measured by the adjacent photodetectors to an event and FIG. 2C shows the centroid of the light spot.
Figure 2C:
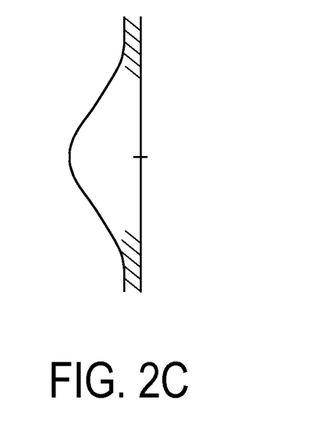

In Single-Photo-Electron Computed Tomography (SPECT), the principle whereof is represented schematically in FIG. 2, a single photon is detected, wherein the energy varies according to the radioisotope used (from 100 KeV to 1000 KeV), by means of a scintillating crystal plate (NaI, CsI, LaBr3) and which is read by large photodetectors (PMT). To obtain an indication on the direction of photon incidence, it is necessary to have lead collimators in front of the crystal which are large, bulky and heavy and which stop a large proportion of the radiation emitted and due to the geometric dimensioning thereof, very few photons are available to construct an image. Furthermore, the spatial resolution in respect of SPECT is less than that in respect of PET due to a lack of precision in localising the interaction.

The system according to the invention makes it possible to:
1) enhance the spatial resolution for SPECT at a constant geometry;
2) avoid having to segment the crystals for PET while retaining a satisfactory spatial resolution;
3) enhance the energy resolution for SPECT; and finally
4) in one embodiment with two plates, do away with lead collimators while retaining a camera in an Anger logic.

At the present time, when a gamma photon interacts with a continuous scintillator plate with good optical quality, the light intensity measured by the photodetectors adjacent to the event is compared. For this, the centroid of the light spot is inferred, which is the location where the interaction is supposed to take place. The overall energy deposited is also measured in order to reject invalid events.

FIG. 2A shows the interaction of the γ photon with an approximately 10 to 20 mm thick NaI:Ti scintillator plate P. A collimator 3 with parallel holes enables the selection of the γ radiation impacting this collimator perpendicular to the surface thereof. A plurality of PMTs (photomultipliers) 10 are positioned so as to measure the light intensity. The photomultipliers 10 are used to convert the optical signal into an electrical signal. These devices act as amplifiers and are relatively large. It is thus not possible to place the number pixels required in the final image. To determine the precise scintillation position, it is necessary to calculate the interpolation between the photomultipliers. Said PMTs (photomultipliers) 10 consist of empty tubes approximately 76 mm in diameter.

Moreover, the spatial resolution is not merely limited by the number of detecting devices, but also by the number of scintillation photons and the extension of the surface wherein they are detected. Indeed, the positioning principle uses the "centroid" computation, and makes it possible to obtain a spatial resolution less than the size of the photomultipliers. The positioning being determined statistically, the number of photons observed will limit the precision of the estimation (FIG. 2B). FIG. 2C shows the centroid of the light spot, which is the location of the interaction. The spatial resolution is approximately 5 to 7 mm, but the contrast is low. This contrast concept covers that of the signal/noise ratio enabling a quantitative assessment of the image quality.

The idea of the present invention is that of differentiating by the spatial and temporal distribution thereof unscattered photons travelling in a straight line from the point of interaction from those having undergone at least one scatter. For this purpose, a segmented photodetector is used, preferably an Si-PMT, along with a temporal data item (time of arrival of first UV photons) and not the light intensity to measure very precisely in space the location of the interaction in a plate in (X, Y) but also in Z (depth of interaction) due to the difference in the shortest light paths and the exact time T (corrected by the travel time at which the interaction took place).

The invention uses the fact that high-speed scintillators suitable for the SPECT application and high-speed electronics for reading same are now available (for example Si-PMT and ASIC type dedicated microelectronic circuit), see the article "LaBr3:Ce scintillation gamma camera prototype for X and gamma ray imaging" 'R. Pani, M. N. Cinti, R. Pellegrini, P. Bennatin . . . published in February 2007'. This article shows very promising characteristics of LaBr3:Ce crystal as a gamma ray imager. In particular, the excellent energy resolution values (6% at 140 keV and ~3% at 662 keV) are obtained when the LaBr3:Ce crystal is coupled with a PMT.

The first UV photons emitted after an interaction represent a sphere wherein the radius increases at the speed of light in the medium in question (LaBr3 index=1.9). The time of arrival of these first photons at the base of the scintillating plate (trigger) may be measured within a few tens of picoseconds, with detectors and suitable electronics. As with the light intensity, it is possible to construct a spatial and temporal distribution of the first n photons detected (xn, yn, tn). Due to the step index between the crystal and the optical crystal/detector coupling, there is a limit angle ThetaL (θL) beyond which the photons are scattered. The unscattered photons are thus distributed in a cone having an angle ThetaL (θL) wherein the vertex is the point of interaction. The greater the difference with the first trigger T1, the further the distance from the point of interaction. The minimum of this distribution is the point of interaction. The benefit of this system is that the distribution of the spot of the first photons, propagated in a straight line from the interaction, is much narrower than for the intensity light spot, which considerably enhances image contrast. Moreover, the double information obtained, both on the light spot (GC) and on the temporal spot (GCT) makes it possible by means of suitable statistical processing to enhance the image further.

As a general rule, the first photons thus fill a sphere wherein the diameter increases over time at a speed v=c/n. The image of this sphere on the plane of the detectors is a circle wherein the diameter increases to reach a limit angle Theta L. These UV photons are propagated at the speed of light (c/n) in the material where for example n=1.9, the index of the medium. The set of unscattered photons is thus a cone wherein the vertex is the point of interaction and the aperture angle Theta L. Then, the difference between the direct photons and scattered photons is calculated.

The only photons detected directly are those emitted in a cone having a point of intersection as the vertex thereof and, as the aperture angle thereof, the angle of total reflection in the scintillating crystal ThetaL=arcsin (n2/n1), where n2=1.4 and n1=1.9 for LaBr3. All the other photons undergo at least one scatter before being detected. This has two consequences: 1) They have a longer optical path (with propagation at c/n) and thus are detected later; 2) They have a high probability of being scattered outside the light control. The light cone thus contains an overdensity of photons.

To process photon scattering, the simplest method is that of considering that when they touch the upper surface, they are re-emitted over 27 steradian to the lower face with an equiprobability in respect of the direction.

Method for calculating the spatiotemporal positioning of an interaction (X, Y, Z, T). The numeric values correspond to a thick plate used for a PET type mode.

For each interaction, the following are measured:
1) A first interaction (X1, Y1, T1);
2) The positron (Xn, yn, Tn) of the first n photons detected for a time between 200 ps and 1000 ps after this first interaction;
3) These data are processed statistically so as to define the diameter of the light cone (which is dependent on z) and the uncertainty thereof (which will give the uncertainty on z);
4) a first estimator of the position of the centre of the cone (xa, ya) based on the calculation of the centroid of the points. This estimation may then be refined by processing the first 10 photons detected. These photons have in principle a shorter path than the others and should verify a law on the progressive widening of the detection cone. The calculation is thus refined to obtain (Xb, yb) and an estimation on the position error made;
5) Given (x, y, z) and the full location of the detection of the first photon on the plane of the detectors (x1, y1, 30, t1), it is possible to estimate the exact time t of the interaction in (x, y, z) and the error on this time estimation.

Finally, it is possible to reconstruct the event in x,y around 2-3 mm with a precision in z around 5 mm and in t around 30 ps. As such, it is possible to obtain a gamma ray detector superior to the prior art by a factor of 2 to 4.

Figure 3A:
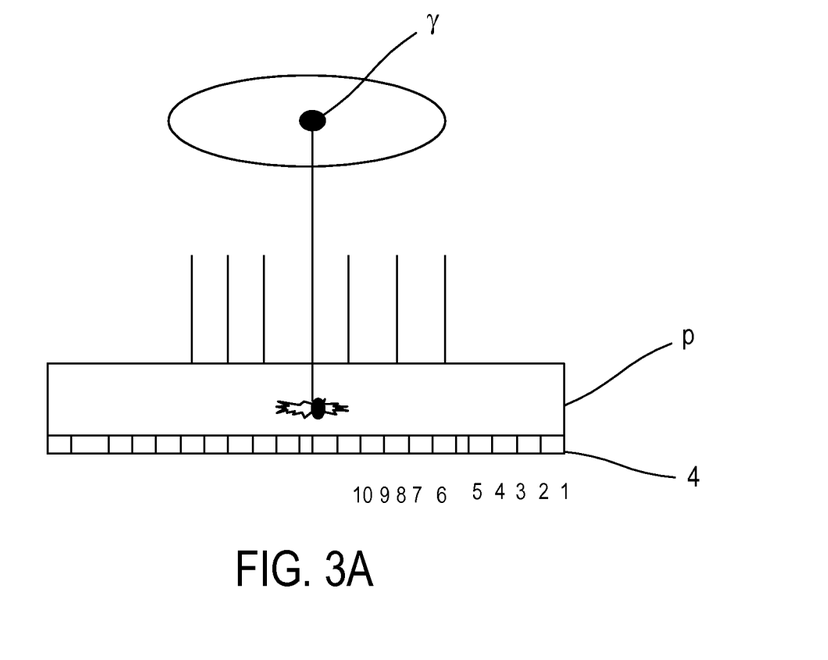
FIG. 3A shows the principle of the temporal SPECT technique and the arrival time of the first photon.
Figure 3B:
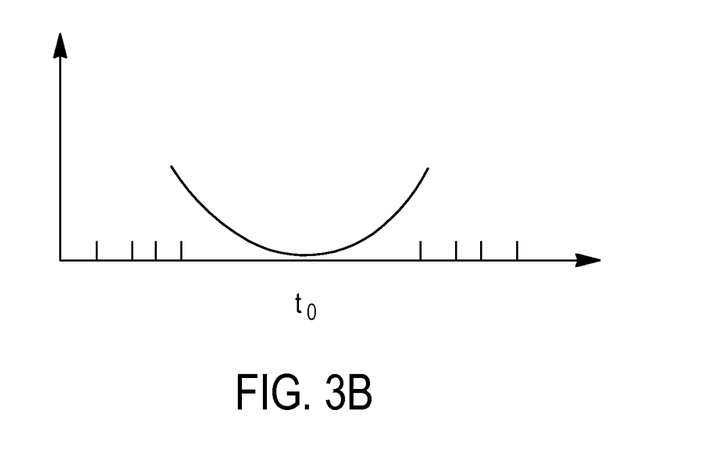
FIG. 3B is an illustrative diagram of FIG. 3A.

FIG. 3A illustrates the Temporal SPECT technique according to the prevent invention, wherein the scintillator plate P (LaBr3) is approximately 30 mm thick, and the photodetector 4 is of the segmented Si-PMT type. The Si-PMT segments are 20×20 mm in 16 channels, i.e. one channel=4 mm×4 mm. Parallel light is emitted isotropically, i.e. the source radiates isotropically in an angle of 4π. The measurement is made on the first wave of photons emitted, i.e. on the first temporal trigger: see the diagram in FIG. 3B. In Temporal SPECT, the centroid is also measured, but as the granularity of the detector is 4 mm×4 mm, the temporal resolution of the triggers is approximately 20 ps, which is equivalent to 4 mm in the LaBr3 crystal.

Furthermore, each of the pixels of this detector has, by means of a dedicated combined analogue/digital ASIC type microelectronic component, a precise measurement within around ten picoseconds from the time when the detector was illuminated for the first time. This enables high-speed detection of the first photons. To obtain this temporal precision, it is necessary to compensate for the response times of the pixel and the ASIC channel (microelectronic component). This compensation is obtained during a calibration phase by illuminating a zone with a collimated source. Without leaving the scope of the invention, a double head may be used for this purpose.

In the current state of the art, a high-speed scintillator with a low level of afterglow, preferably LaBr3, is required to reconstruct temporal imaging of the interaction: see article "LaBr3:Ce scintillation gamma camera prototype for X and gamma ray imaging" 'R. Pani, M. N., Cinti, R. Pellegrini, P. Bennatin . . . published in February 2007'. Although the shortest time that can be measured with a fast scintillator such as LaBr3 on a 25 mm pixel is 200 ps, this time is essentially due to the uncertainty in respect of the location of the interaction at the top or bottom of the pixel. In a continuous scintillator, by comparing the times measured by adjacent photodetector pixels, it is possible to determine the height (z) where the interaction takes place and thus obtain a precise value within a few tens of ps (10 ps=2 mm in LaBr3) of the time of interaction on the entry face of the crystal. Once a functional model of the crystal is available, the temporal localisation precision is markedly superior to that of the spatial resolution.

In adjacent photodetectors, there is no optical interface; hence, the most direct path is counted.

A further benefit of the present invention is that, having a temporal and spatial map of an interaction, it is possible to differentiate two adjacent events in space and time. In Anger logic, if the energy is not correct, i.e. if the energy emitted is different to the energy of the radioisotope used, it is not possible to differentiate two adjacent events. This contributes to dispersion on the image.

A further benefit of the invention is that it makes it possible to correct edge effects. For this, a plurality of plates may be bonded together, next to each other, to reconstruct a large surface, making it possible to correct edge effects. This is particularly advantageous in the case of relatively small crystals, for example for Lanthanide halides.

In Anger logic, if two scintillator plates are bonded, the light distribution is significantly disrupted by partial reflections on the optical interface and thus the spatial position of the interaction inferred from the shape of the light spot is incorrect. However, the most direct light paths passing through the optical interface with an incidence close to the normal are deviated to a small degree. Therefore, the time of flight measured from the point of interaction is correct. There are zones on the other side of the plate (the optical interface) that can be used to reconstruct, from the direct paths of the photons, a correct localisation of the interaction.

Figure 4A:
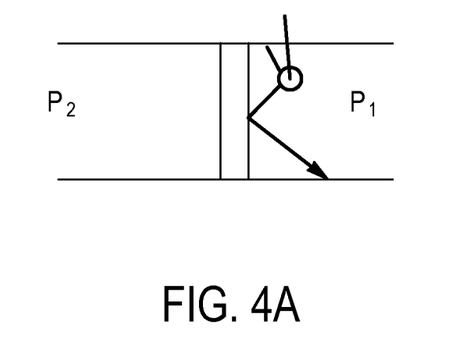
FIGS. 4A and 4B illustrate a comparison of the edge effect in the case of conventional SPECT (5A) and temporal SPECT (5B)
Figure 4B:
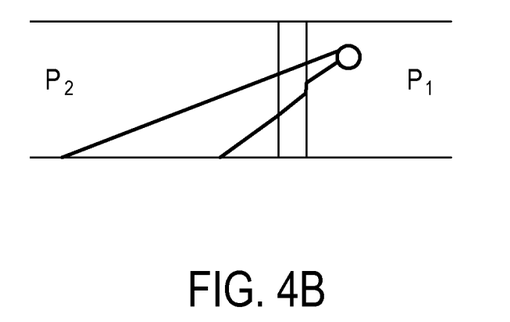

FIGS. 4A and 4B illustrate a comparison of the edge effect in the case of conventional SPECT (4A) and temporal SPECT according to the present invention (4B). In the case of conventional SPECT (FIG. 4A), the plates P1 and P2 are bonded edge to edge with a high-index adhesive, it is observed that a large proportion of the light is reflected. Consequently, the light distribution is disrupted. In the case of Temporal SPECT (FIG. 4B), according to the invention, the path of the first photons emitted is subject to little disruption, thus the temporal minimum can be reconstructed correctly and thus edge effects can be corrected.

The embodiment of the detection system using Si-PMT or API) type semiconductor detectors is particularly advantageous as they are much more compact that PMs (photomultipliers), thus the internal transfer times to the detectors are shorter. This makes it possible to expect a superior temporal resolution. Furthermore, these detectors have a negligible gamma radiation capture cross-section; they may thus be positioned frontally, as in the case of a two-plate Compton system according to one embodiment of the invention.

The detection system described may further function in the same way for the PET mode without a collimator. Indeed, processing induces virtual pixelation of the detector plate which avoids having to segment the plate physically and saves significant costs. Furthermore, the measurement of the depth of interaction takes place naturally with a single detector plane, in a configuration which is that of a conventional gamma camera. This mode makes it possible to obtain superior performances with less dense and less expensive scintillators such as Lanthanide halide.

The detection system described may further function in the same way without a collimator for the PET mode with the following advantages.

In an LaBr3 type scintillator wherein the rise time to the light peak is approximately 800 ps, the resolution of the detection in terms of energy is enhanced by counting the unscattered photons detected for a given time greater than the rise time (rise time to the light peak) of the scintillator (800 ps for LaBr3), only accounting for the events detected in the light cone. As a general rule, in a monolithic plane detector, the energy resolution is degraded with respect to the theoretical optimum. The energy resolution is indeed linked with the number of photons detected for a given energy event. In a plane detector, most of the photons detected have undergone multiple scattering from the point of emission thereof. During this scattering, a variable percentage of photons are lost. The present invention provides a solution, by only counting the unscattered photons from the light cone, the specific proportional number of photons/energy relationship for the scintillator is found. As such, it is possible to obtain an energy resolution of the order of 3% with LaBr3:Ce.

A further benefit of the invention is that, in the event of use of the PET technique, the single-plate plane semiconductor detector may be substituted for segmented detectors. It is possible for example to position about the patient a polygonal cylinder formed from detector plates, so as to reconstruct a ring. This type of detector makes it possible to obtain particularly high performances in terms of Time of Flight (within-ring) due to the use of LaBr3 and the correction of the depth of interaction of the radiation and the particularly precise temporal localisation.

Figure 5:
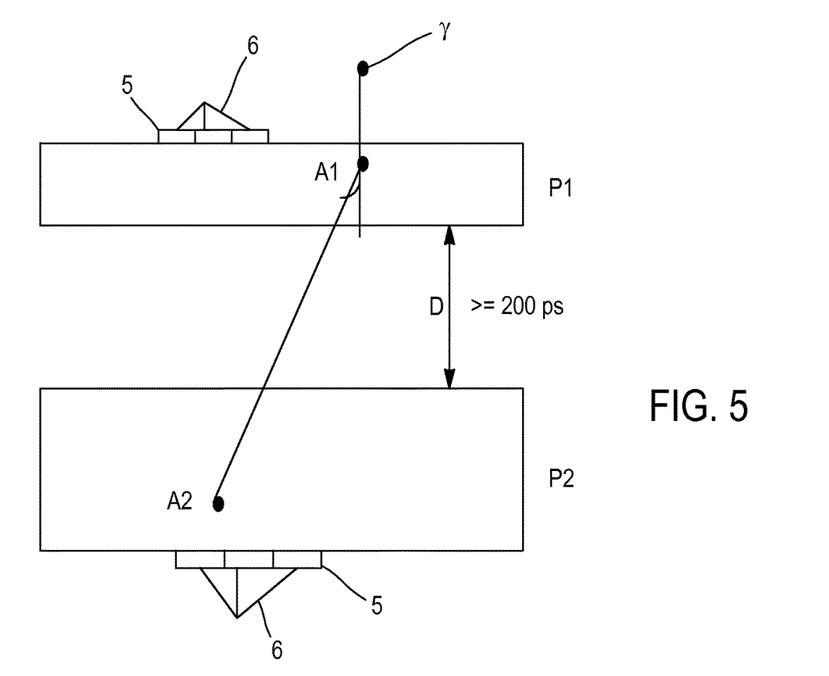
FIG. 5 shows an embodiment of the invention with two scintillator plates.
Figure 6:
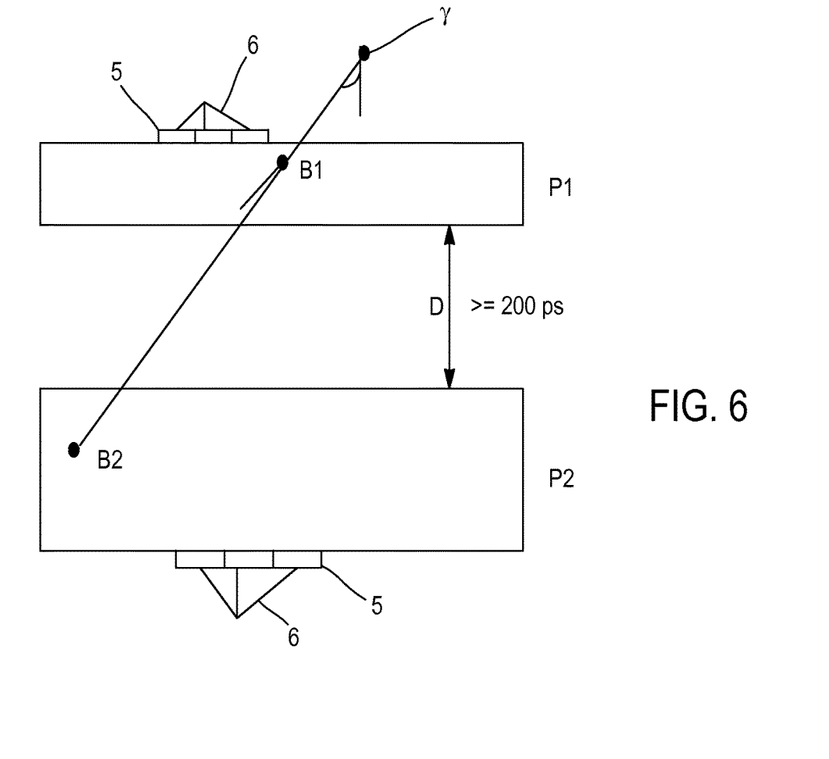
FIG. 6 shows the system with two scintillator plates for detecting gamma rays emitted with an angle less than or equal to 45°.

FIG. 5 represents a further embodiment of the invention whereby the detection system particularly includes: two scintillator plates P1 and P2, Si-PMT photodetector arrays 5 and the associated electronics 6, bonded each plate P1 and P2. The first plate P1 is thin and has a thickness greater than 5 mm. On this first plate, the following are measured: the time of impact of the gamma ray, the first trigger T1; a spatial distribution of the triggers, so as to situate an event e1 in (X1, Y1); a spatial distribution of the luminosity in A1 (X'1, Y'1); and the integral of the energy (E1) emitted during the event in the plate P1. Such a system further includes a second scintillator plate P2, thicker than the first. Said second plate P2 has a thickness greater than 10 mm and makes it possible to absorb more than 80% of the energy of the gamma photon by means of the sufficient thickness thereof. The second plate P2 is separated from the first plate P1 by a distance 'D' of at least 10 mm required to detect the trigger on the second plate. On this second plate P2, the following are measured: the time of impact of the gamma ray, i.e. a first trigger T2; a spatial distribution of the triggers in (X2, Y2, Z2); a spatial distribution of the luminosity in A2 (X'2, Y'2); and the integral of the energy (E2) emitted during the event in this plate. Sorting is then performed to determine whether the event is valid. The sorting is performed by means of the following two tests:

E1+E2=Energy of the radioisotope used and T2=T1+propagation time of light between the event e1 and the event e2.

If the event is valid, the gamma ray propagation vector in the system may be calculated. Furthermore, the ratio of the energies (E1/E1A+E2) makes it possible to estimate the Compton deviation (angle α) with a precision dα relative to the initial direction of the gamma ray. It is then known that the interaction takes place in a direction within a cone having an axis A1A2 and angle between α−dα and α+dα. The events of most interest in terms of imaging are obviously those where α is small, hence the benefit of a thin entry plate. As a large number of events are eventually obtained, an image may consequently be reconstructed.

Once the position of the spatial and temporal triggers has been documented, it is possible to integrate all the radiation emitted in order to measure the energy precisely, rejecting Compton variations. Preferably in such a two-plate system, the plates are set up face-to-face and the photodetectors are positioned on the outside of the volume defined by the two plates P1 and P2 arranged facing each other.

For such a system according to the invention to function, firstly, it is necessary to have high-speed, high-luminosity scintillators with a low afterglow, such as Lutetium oxide (LYSO, LSO), preferably, lanthanide halides (LuI3, LaBr3, LaCl3). The photodetectors should be fast, compact, with a small gamma radiation capture cross-section. In the configuration including two plates P1, P2, the photodetectors are traversed by the gamma radiation, with great homogeneity in respect of temporal response from channel to channel.

In some embodiments of the invention, conventional photodetectors (PMTs) may be used, but semiconductor photodetectors (Si-PMTs) are preferred.

The quality of the processing electronics of the semiconductor photodetectors, Si-PMTs, should: have a temporal resolution on the detection of the first photon (trigger) greater than 20 ps; be very similar to Si-PMTs to avoid any delays due to charge transport; and have low gamma radiation absorption. This leads to a preference for ASIC type microelectronic solutions.

At the present time, the scintillators with the best performances are hydroscopic and a glass plate is inserted between the crystal and the photodetector. In the invention, the preferred embodiment includes a thick plate (typically 30 mm for LaBr3 for 511 Key) with a photodetector, Si-PMT, bonded directly onto the crystal to limit reflections due to the optical interfaces. The crystal, Si-PMTs and ASIC microelectronic components are thus preferentially arranged in a tight enclosure.

Given that Compton scattering should be avoided between the two plates, the inter-plate space is empty or filled with inert gas with a low atomic number such as Helium, Neon, Argon. The plate separation, the distance between the two plates P1 and P2, should be sufficient to be able to clearly differentiate the triggers T1 and T2. For the lanthanum halide LaBr3, a propagation time of 200 ps equivalent to approximately 60 mm in air is preferred.

Given the greater complexity of the detectors and processing electronics in relation to a conventional camera, such an assembly of plates/detector/electronics could replace the devices currently present on existing cameras.

A further benefit of the system according to the invention is the application thereof in fields wherein the number of gamma photons to be detected is low, such as astronomy.

The system according to the invention with one or two plates may be used for a PET type examination. In this case, a fast scintillator plate such as LaBr3 should have a thickness greater than 20 mm to be able to stop 511 KeV photons. In the case of a single scintillator plate, the presence of a collimator is required. If a two-plate system is used, the collimator is no longer necessary. Whether the detector contains one or two plates, it should be set up facing each side of the patient.

Numerous combinations may be envisaged without leaving the scope of the invention; those skilled in the art will choose one or the other according to the economic, ergonomic, dimensional or other constraints to be fulfilled.

The invention claimed is:

1. A gamma radiation detection system of a gamma camera type or Compton camera type, comprising:
    a source of gamma rays;
    at least one plate P1 of a fast scintillator having a rise time to the light peak of less than 1 ns with a scattering entry surface and a polished exit surface, having a thickness greater than or equal to 10 mm, equipped with a segmented photodetector and dedicated reading microelectronics, wherein each segment of said photodetector is configured to locate a first trigger T1, corresponding to the time of arrival of the first UV ray emitted by the scintillation on said at least one plate P1, wherein the photodetector is configured to measure spatial and temporal distribution of the first adjacent photons emitted by an event on the detectors during a period of more than 100 ps and less than or equal to the rise time to the light peak of the scintillator thereby to spatially localize said event of coordinates (X1, Y1), wherein the photodetector is further configured to exploit the difference between spatial and temporal distribution of non-scattered photons and scattered photons to reconstruct the spatial and temporal coordinates (X1, Y1, Z1, T1) of said event, and wherein the first detected photons are the non scattered photons distributed within a disk whose radius depends on interaction depth (Z1) and wherein its centre represents a position (X1, Y1) of the event.

2. The system according to claim 1, wherein the photodetector measures the exact time of the interaction T by reconstructing a path in the scintillator of the first ten detected photons.

3. The system according to claim 1, wherein the plate P1 is of the Lanthanide Halide type, equipped with the segmented photodetector with a pitch less than at least half of a thickness of the plate, and wherein the dedicated reading microelectronics are of an ASIC type comprising an analogical part having a temporal resolution per channel less than 50 ps.

4. The system according to claim 1, wherein the detector is configured to measure a spatial distribution of luminosity A1 in (X'1, Y'1) and the integral of the energy E1 as in a conventional gamma camera.

5. The system according to claim 1, wherein the photodetector is an SI-PMT or APD type.

6. The system according to claim 1 characterised in that it includes a plurality plates of scintillator bonded edge to edge, to form a surface and to correct edge effects, said surface being a plane for a SPECT application or a ring for a PET application.

7. The system according to claim 1, further comprising a second plate P2 scintillator of a thickness for absorbing at least 80% of the energy of the gamma ray, said second plate P2 being separated from the first plate P1 by a distance 'D' of at least 10 mm, an estimation module for determining a valid event, a module for estimating the Compton deviation, the second plate P2 equipped with the segmented photodetector and a dedicated reading microelectronics, wherein the system is configured to measure on said second plate P2 a first trigger T2, a spatial distribution of the triggers suitable for spatially localizing a second event "e2" in (X2, Y2, Z2), a spatial distribution of luminosity A2 in (X'2, Y'2) and the emitted energy E2 during the event "e2" in said plate P2, and in that said second plate P2 provides information on the path of the gamma ray without any rejection.

8. The system according to claim 7, further comprising a module for computing the valid event, wherein the temporal distribution vectors, the time of arrival of the gamma ray impact on the plates P1 and P2, and the spatial distribution vectors are intersected in order to improve accuracy of the localisation of the interaction in said plates.

9. System according to claim 7, wherein the plates (P1) or (P1 and P2), the photodetectors and the electronic components are arranged in an air tight enclosure.

10. A SPECT type or PET type medical imaging system comprising the system of claim 1.

11. A method of image-reconstruction upon impact of a gamma ray on a plate P1, comprising:
   measuring a first trigger T1, corresponding to the time of arrival of the first UV ray on the plane of segmented detectors on said plate P1;
   measuring a spatial and temporal distribution of the adjacent triggers, on the plane of the photodetectors, in order to spatially localize an event "e1" in (X1, Y1) on the normal of the minimum of trigger distribution;
   measuring a spatial distribution of the luminosity A1 in (X'1, Y'1) and the integral of the energy E1.

12. The method according to claim 11, further comprising the following steps performed on a plate P2:
   measuring a first trigger T2;
   measuring a spatial and temporal distribution of the triggers in order to spatially localize an event "e2" in (X2, Y2, Z2);
   measuring a spatial distribution of the luminosity A2 in (X'2, Y'2) and the emitted energy E2 during the event "e2" in said plate P2;
   determining a valid event using estimation module by performing the following two tests:
   a) T2=T1+propagation time of light between e1 and e2;
   b) E1+E2=Energy of used radioisotope,
   determining the Compton deviation having an angle "alpha" with a precision dα in relation to the initial direction of the gamma ray, the ratio of the energies (E1/E1+E2) allowing for estimation of the Compton deviation;
   defining the information on the path of the gamma ray.

* * * * *